United States Patent [19]

Houman et al.

[11] Patent Number: 4,638,141
[45] Date of Patent: Jan. 20, 1987

[54] MODULAR EDM SYSTEM

[75] Inventors: Leif Houman, Oyster Bay; Leonard M. Wohlabaugh, Miller Place, both of N.Y.

[73] Assignee: Xermac, Inc., Royal Oak, Mich.

[21] Appl. No.: 736,138

[22] Filed: May 20, 1985

[51] Int. Cl.⁴ .................. B23H 1/00; B23H 7/26
[52] U.S. Cl. ................... 219/69 R; 219/69 G; 219/69 V
[58] Field of Search ........... 219/69 E, 69 V, 69 M, 219/69 G, 69 R, 68

[56] References Cited

U.S. PATENT DOCUMENTS

| | | | |
|---|---|---|---|
| Re. 29,399 | 9/1977 | Inoue | 219/69 G |
| 3,200,231 | 8/1965 | Bejat | 219/69 E |
| 3,609,279 | 9/1971 | Giesbrecht | 219/69 G |
| 3,614,371 | 10/1971 | Simpkins | 219/69 V |
| 3,725,631 | 4/1973 | Angelucci | 219/69 G |
| 3,806,691 | 4/1974 | Roach | 219/69 G |
| 3,878,351 | 4/1975 | Rocklin | 219/69 G |
| 4,088,032 | 5/1978 | O'Connor | 219/69 E |
| 4,387,284 | 6/1983 | Nicholas et al. | 219/69 G |
| 4,423,302 | 12/1983 | Shimizu | 219/69 E |
| 4,436,976 | 3/1984 | Inoue | 219/69 V |
| 4,439,659 | 3/1984 | Shimizu | 219/69 V |

*Primary Examiner*—A. D. Pellinen
*Assistant Examiner*—Geoffrey S. Evans
*Attorney, Agent, or Firm*—Brooks & Kushman

[57] ABSTRACT

A modular EDM system including a compact servo slide assembly provides flexibility, accuracy and positional repeatability. The servo slide assembly includes a frame member provided with a precision dovetail for mounting on a column or bracket having a mating dovetail. The assembly also includes a slide member having a dovetail to receive and retain an electrode assembly thereon.

7 Claims, 4 Drawing Figures

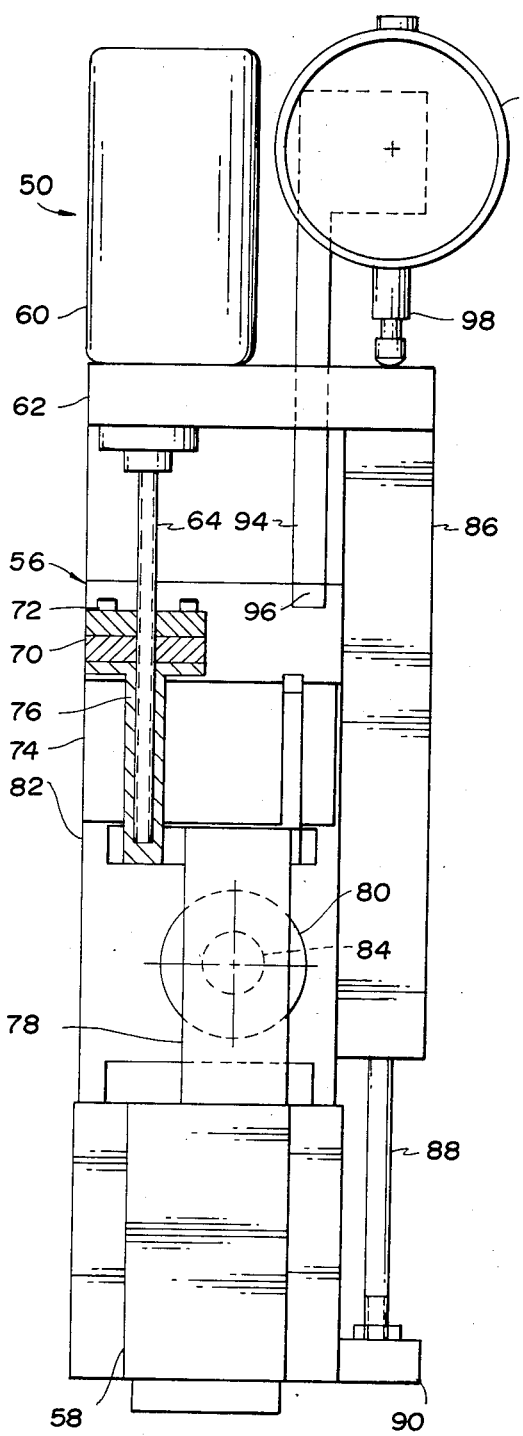
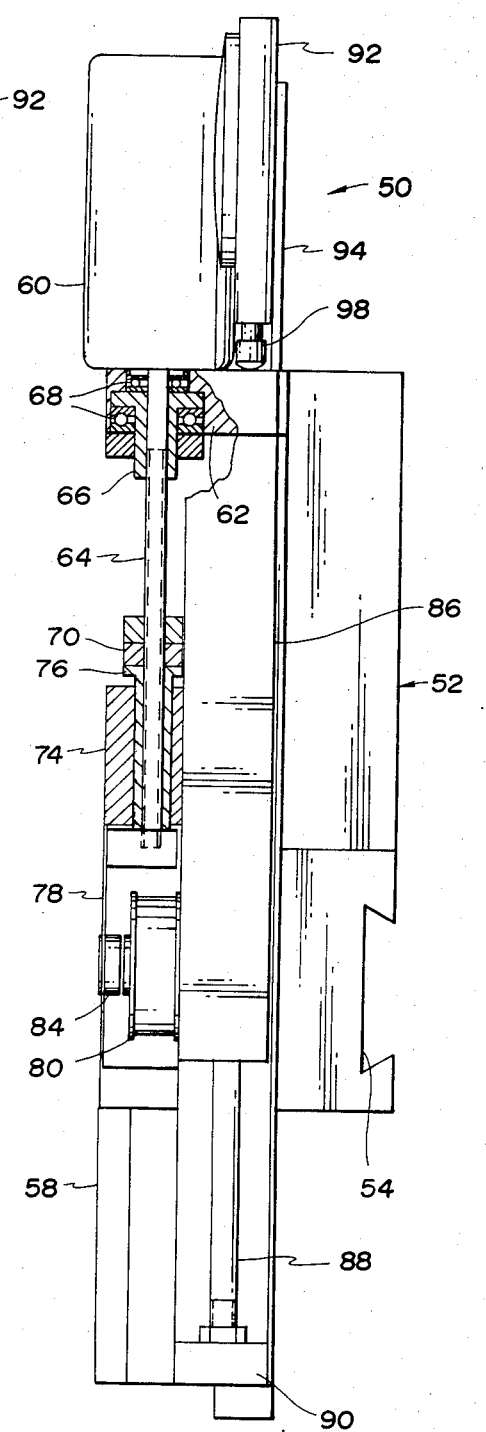
Fig. 3
Fig. 4

MODULAR EDM SYSTEM

TECHNICAL FIELD

This invention relates to modular EDM systems and, in particular, to modular EDM systems having a compact servo slide assembly.

BACKGROUND ART

Instrumentation, air pollution abatement equipment, scientific instruments, medical devices such as needles and implants, fuel injection nozzles, spinnerettes and gas escapement orifices are some of the produces that require extremely small holes, including those holes with other-than-round shapes. Diesel fuel injectors require holes between 0.005 and 0.01 inches in diameter.

The traditional method of small hole drilling involves a drill bit that is subject to easy breakage, and a sensitive drill press in the hands of a skilled operator. The cost is usually high with broken drills and scrapped parts. If the workpiece is a hardened metal, the problems are compounded.

Electric discharge machining (EDM) has been employed from time to time in the drilling of small diameter holes. EDM has worked to a degree even though the results are usually far from optimum since most EDM equipment is designed to handle work on a much larger scale. Amperages, spark frequencies and overcuts that are ideal for machining a die segment, leave much to be desired in the task of drilling a fine, accurate hole with no appreciable layer of recast and solidified material on the hole surface.

EDM, however, still offers numerous advantages in the drilling of small diameter holes. One such advantage is that the hardness of the workpiece to be drilled is irrelevant as long as the material is electrically conductive and a spark can be forced to jump from an electrode to the workpiece. The rate of metal removal is a function of electrical conductivity and thermal characteristics of the workpiece. While extremely hard materials sometimes have a higher melting temperature, it is the melting temperature, not the hardness, that is the governing factor.

On the other hand, if the workpiece has no electric conductivity, the EDM process cannot be used. However, all metals and metallic alloys are electrically conductive to some degree and yield to the controlled cascade of sparks.

Another advantage of the EDM process is that, when properly controlled, the EDM hole drilling process is very accurate and has a high degree of stability. Because there is no direct contact between the electrode and the workpiece, there are no mechanical forces of the type found in conventional drilling. In small hole work, there is frequently not even a flow of dielectric fluid into the gap area to set up mechanical forces. The energy utilized in the actual metal removal process is divided into very high frequency sparks which are closely controlled with electronic systems now available.

With the EDM process there is no undue heat generation or any significant mechanical forces involved. Consequently, there is no part distortion. As a result, extremely thin and/or fragile parts can be successfully drilled with the EDM process.

Also, once the EDM job is set up, it can be completely cycled in an automatic fashion. As a result, skilled operators are not required.

The tool cost per hole is also extremely low. To drill holes under 0.015 inches in diameter, a tungsten alloy wire electrode which comes in spools is used. For sizes over 0.015 inches, straight rods are usually used. By way of example, typically hundreds of dollars of tungsten alloy wire will furnish enough electrode material to drill millions of holes in diesel fuel injector nozzles.

Still another advantage of the EDM process is the ability to vary the hole diameter within a limited range by simply changing current parameters without changing the electrode itself. By contrast, the diameter of mechanically drilled holes is determined by the diameter of the cutting tool. In order to resize the holes the size of the tool must be changed or a secondary operation must be performed. In EDM there is always an overcut comprising the spark gap between the electrode and the workpiece. The gap is a direct function of currrent flow and the frequency with which it is applied. In particular, the higher the current flow or the lower the frequency of sparking, the greater the gap. On normal EDM work, the gap may be anywhere from 0.001 to 0.003 inches on a side. Thus, in hole drilling work, the hole diameter is always larger than the tool itself. In small hole work the overcut is relatively small, but it can be closely controlled.

There are no burrs on the holes produced by the EDM process. Metal is eroded away in very minute globules to leave a non-directional type of surface finish. In the amperage and frequency ranges utilized in small hole EDM drilling, a recast surface is virtually non-existent.

Production EDM, for the most part, still uses standard toolroom EDM machines which include elaborate fixturing and/or bulky workpieces. For example, large C-framed machines capable of lifting several hundred pounds, are still being used with electrodes or electrode assemblies weighing only a few ounces. The result is an expensive, over-dimensioned machine tool capable of handling heavy electrodes and not necessarily able to respond correctly to small electrodes. In addition, there is a large waste of energy in running the relatively large, hydraulic servo system.

Another approach taken by EDM manufacturers is to build a custom EDM machine which is capable of performing only one job. Such a machine is not only costly, but delivery times are typically very long. Also, when the particular job for which the machine has been designed is completed, the machine is worth very little to the user. In any case, the original purchase can only be justified in economic terms if the machine is to be used for a relatively long run of jobs.

Consequently, there is a need for a flexible, yet accurate, modular EDM system which can be easily assembled to perform a given job and then can be taken apart and rearranged for the next job. This is to be contrasted with a standard, toolroom EDM machine which includes many features which are never used during production jobs. By buying a modular system, one need only buy components necessary for a particular production job.

Such a system should also be adaptable to accommodate such devices as rotating spindles having rod or wire electrode refeed, electrode holders, either single or multiple; slotting heads with automatic wear compensation; and automatic tool changers.

DISCLOSURE OF THE INVENTION

An object of the present invention is to provide a modular EDM system adapted to support an electrode assembly to move in a controlled fashion wherein the system includes a base tool and first and second accessory tools and wherein the first accessory tool is adapted to be removably and adjustably mounted on the base tool and the second accessory tool comprising a servo slide assembly is adapted to be removably and adjustably mounted on the first accessory tool.

Another object of the present invention is to provide a modular EDM system adapted to support an electrode assembly including a servo slide assembly having a frame member adapted to be removably and adjustably mounted on an adjustable first accessory tool and a slide member slidably supported on the frame member wherein the slide member is adapted to removably and adjustably receive and retain an electrode assembly thereon.

In carrying out the above objects and other objects of the present invention, the modular EDM system comprises a base tool adapted to removably and adjustably receive and retain a first accessory tool comprising a spacer adapted to be removably and adjustably mounted on the base tool. The spacer is adapted to removably and adjustably receive and retain a second accessory tool thereon. The second accessory tool comprises a servo slide asembly including a frame member adapted to be removably and adjustably mounted on the spacer and a slide member slidably supported on the frame member. The slide member is adapted to removably and adjustably receive and retain the electrode assembly thereon. The slide assembly further includes a motor coupled to the slide member and adapted to receive an electrical control signal to controllably move the slide member relative to the frame member along a slide axis.

Preferably, the spacer comprises a swivel spacer to permit angular adjustment of the slide assembly relative to the base tool.

Also, preferably, each of the accessory tools includes male and female dovetails to provide an adjustable dovetailed joint for interconnecting the accessory tools. The motor of the slide assembly preferably has a threaded drive shaft rotatably supported on the frame member. The slide assembly includes a split nut coupled to the slide member and threadly mounted on the shaft to move therealong upon rotary movement of the shaft to move the slide member relative to the frame member along the slide axis.

The advantages of a modular EDM system constructed in accordance with the above are numerous. For example, the system provides a cost-effective solution to a number of jobs instead of being dedicated to a single job. The delivery time of providing such a system is relatively short. The occupied space or footprint of the system is relatively small. A relatively large amount of energy can be saved by using such a down-scaled system. Down time is minimized in that spare modules can be inventoried for easy replacement. Finally, electrodes can be preset or preloaded in one module while another module is being used for cutting. Furthermore, the system is capable of holding a number of different electrode assemblies.

The objects, features and advantages of the present invention are readily apparent from the following description of the best mode for carrying out the invention when taken in connection with the accompanying drawings.

BRIEF DESCRIPTION OF THE DRAWINGS

FIG. 3 is a front elevational view, partially in cross-section, illustrating a preferred servo slide assembly for use in the system; and FIG. 4 is a side elevational view, partially broken away and in cross-section, of the assembly of FIG. 3.

BEST MODE FOR CARRYING OUT THE INVENTION

Figure 1:
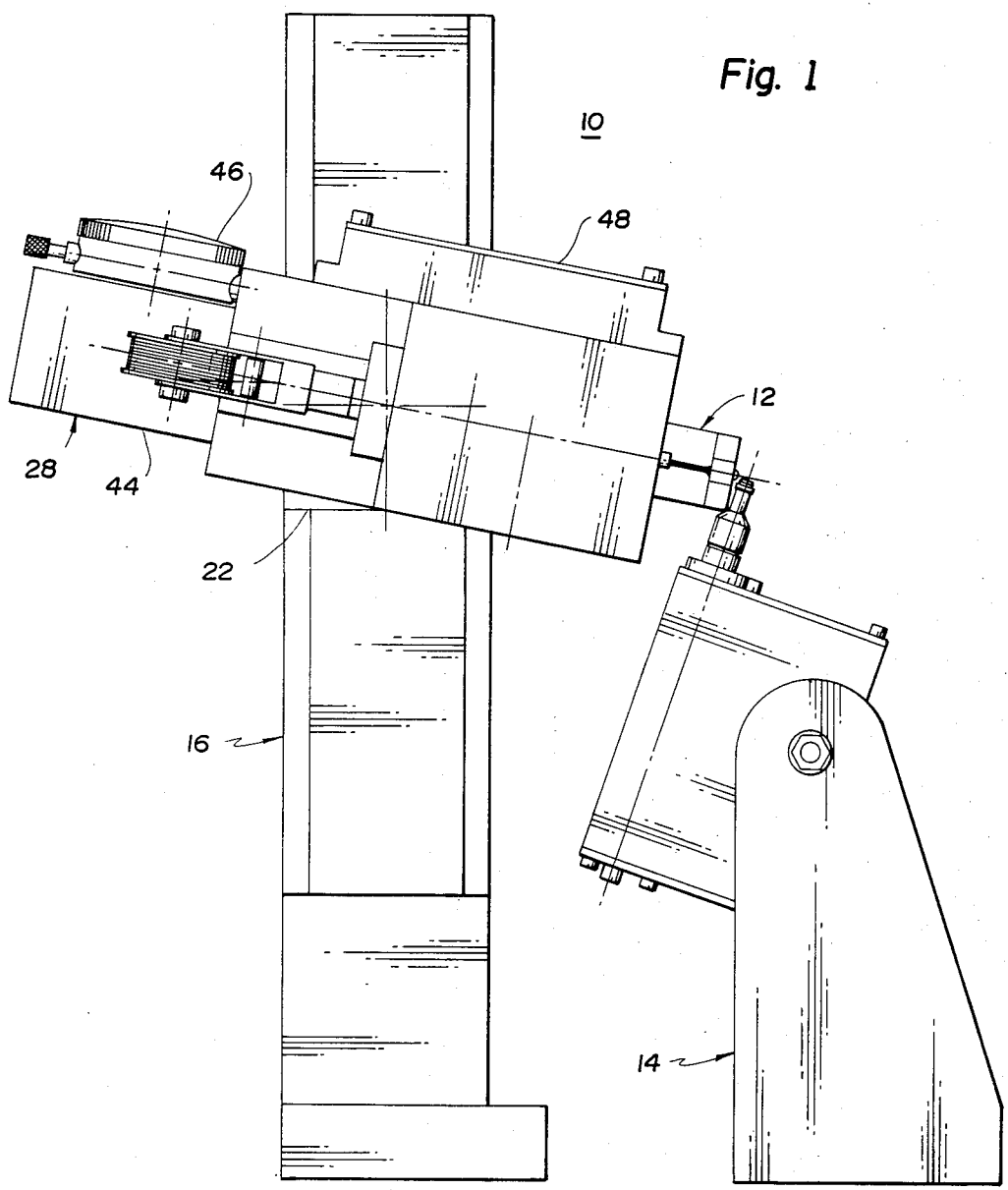
FIG. 1 is a side elevational view of a modular EDM system constructed in accordance with the present invention.
Figure 2:
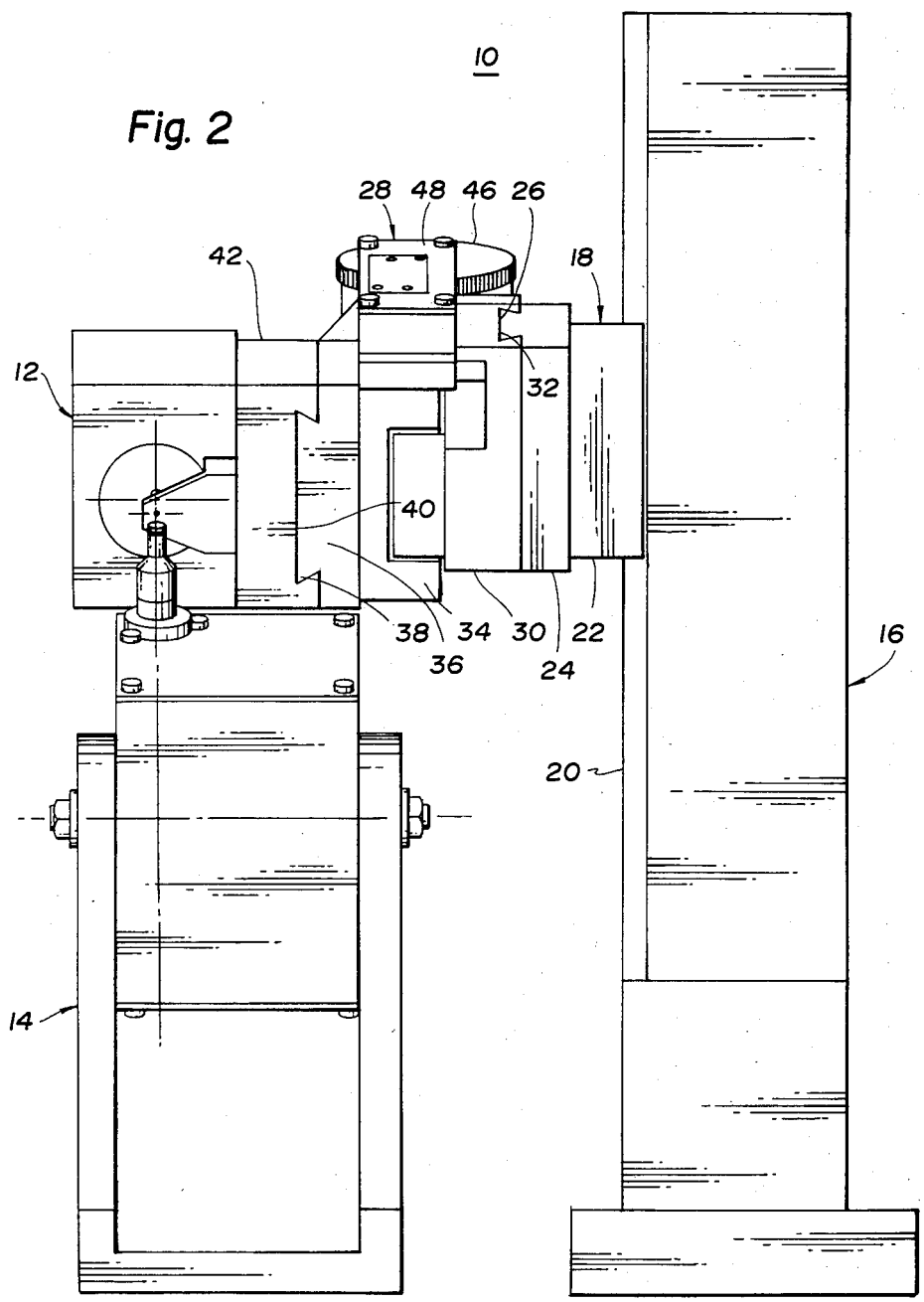
FIG. 2 is a front elevational view of a system of FIG. 1.

Referring now to FIGS. 1 and 2, there is illustrated a compact, modular EDM system, collectively indicated at 10. The system 10 is adapted to support an electrode assembly, such as an electrode assembly generally indicated at 12, to move in a controlled fashion. Also illustrated in FIGS. 1 and 2 is a set-up device, generally indicated at 14 for properly positioning and adjusting the system 10 when assembled.

The system 10 includes a base tool, generally indicated at 16, which may be mounted on a machine table. The baes tool 16 is adapted to removably and adjustably receive and retain a first accessory tool such as a swivel spacer, generally indicated at 18, at a male dovetail 20. The length of the dovetail 20 permits the addition of other accessory tools thereon.

The swivel spacer 18 includes a first part 22 which has a female dovetail for attachment to the male dovetail 20 of the base 16. The swivel spacer 18 also includes a second part 24 which is pivotally attached to the first part 22 to rotate through a 360° angle. While not shown, the swivel spacer includes a hydraulic locking device which locates a particular set angle between the first and second parts 22 and 24, respectively. Accurate setting of the angle between the first and second parts 22 and 24 respectively, may be accomplished by a sine-bar tool (not shown).

The second part 24 of the swivel spacer 18 includes a male dovetail 26 for removably and adjustably receiving and retaining a second accessory tool, a first embodiment of which comprises a servo slide assembly, generally indicated at 28. The servo slide assembly 28 includes a frame member 30 having a female dovetail 32 to permit the servo slide assembly 28 to be removably and adjustably mounted on the second part 24 of the swivel spacer 18.

The servo slide assembly 28 also includes a slide member 34 which is slidably supported on the frame member 30 by ball slides. A block 36 is mounted on the slide member 34 and includes a male dovetail 38 to removably and adjustably receive and retain the electrode assembly 12 theron by a female dovetail 40 formed in a block 42 of the electrode assembly 12.

The electrode assembly 28 also includes a servo motor 44 having a threaded drive shaft (not shown) rotatably supported on the frame member 30. A split nut (not shown) is coupled to the slide member 34 and is threadedly mounted on the threaded drive shaft to move therealong upon rotary movement of the drive shaft of the servo motor 44.

A dial indicator 46 is mounted on the frame member 30 and is connected to the slide member 34 to provide a visual indication of the relative position therebetween.

A depth stop mechanism 48 is also mounted on the frame member 30 to conventionally control the position of the slide member 34 relative to the frame member 30.

The assembly 28 is provided with an adjustable feed stop (not shown) which will stop the slide member 36 a given distance from the workpiece and at the same time provide a signal to refeed the electrode of the electrode assembly 12.

Referring now to FIGS. 3 and 4, there is illustrated a second, preferred embodiment of a servo slide assembly generally indicated at 50 which takes the place of the servo slide assembly 28 in the system 10.

The assembly 50 includes a frame member, generally indicated at 52, including a female dovetail 54 for removably and adjustably mounting the frame member 52 to the second part 24 of the swivel spacer 18. The assembly 50 also includes a slide member, generally indicated at 56, which is slidably supported on the frame member 52 by ball slides (not shown). The slide member 56 is adapted to removably and adjustably receive and retain an electrode assembly, such as the electrode assembly 12, at a male dovetail 58.

The slide assembly 50 also includes an electric servo motor 60 which is mounted on a block 62 of the frame member 52. The motor 60 rotatably drives a lead screw 64 which is supported by a thurst bearing 66 and also by bearings 68 on the block 62.

A split nut 70 held together by bolts 72 is threadedly mounted on the shaft 64 to move therealong upon rotary movement of the lead screw 64. The split nut 70 is coupled to a block 74 by a second thrust bearing 76. In turn, the block 74 is coupled to the male dovetail 58 by a spring steel member 78 and an interconnecting block 82.

The slide assembly 50 also includes a solenoid 80 mounted on the interconnecting block 82 to move with the rest of the slide member 56. The solenoid 80 includes a plunger 84 which is attached to the spring steel member 78 so that when the solenoid 80 is energized by control signals, the plunger 84 causes the spring steel member 78 to vibrate. In turn, the male dovetail 58 also vibrates so that an attached electrode assembly, such as the electrode assembly 12 also vibrates. Such electrode vibration or agitation draws fresh dielectric fluid into the spark gap between the electrode and the workpiece and works contaminated dielectric fluid out of the spark gap.

In many EDM applications it is possible to pump a supply of dielectric fluid to the electrode and force it out through the gap between the tool and the workpiece to flush away the machined debris. This is not possible when utilizing a fine wire. Thus, the method of getting a dielectric fluid into the cut is a combination of a wash across the hole being machined which sets up a certain amount of flow within the work area, plus a vibration of the tool.

The assembly 50 also includes a position transducer 86 which is carried by the frame member 52. The position transducer 86 includes a plunger portion 88 which extends between the housing of the position transducer 86 and a block 90 mounted on the male dovetail 58. The position transducer 86 provides an electrical signal representation of the relative position between the frame member 52 and the slide member 56.

The assembly 50 also includes a dial indicator 92 which is fixedly mounted on an angled link 94 which, in turn, is fixedly mounted to the slide member 56 at a position 96 to move therewith. A plunger part 98 of the dial indicator 92 touches the top surface of the block 62 so that upon relative movement between the slide member 56 and the frame member 52, the dial indicator 92 will provide a visual indication of the relative position therebetween.

The advantages of the above-described system are numerous. For example, the system can be utilized for a number of different jobs instead of being dedicated to one particular job. Furthermore, such a compact system can be produced and delivered in a shorter amount of time. The space occupied by such a system is kept to a minimum. Also, such a system utilizes a small amount of energy. Down time of the system is minimized as spare modules can be inventoried for easy replacement. Also, electrodes can be preset or preloaded in one module while the other module is cutting.

The invention has been described in an illustrative manner and it is to be understood that the terminology which has been used is intended to be in the nature of words of description rather than of limitation.

Many modifications and variations of the present invention are possible in light of the above teachings. It is, therefore, to be understood that within the scope of the appended claims, the invention may be practiced otherwise than as specifically described.

What is claimed is:

1. A modular EDM system adapted to support an electrode assembly to move in a controlled fashion, said system comprising:

a base tool adapted to removably and adjustably receive and retain a first accessory tool thereon;

a first accessory tool comprising a swivel spacer adapted to be removably and adjustably mounted on said base tool, said spacer permitting angular adjustment and also being adapted to removably and adjustably receive and retain a second accessory tool thereon; and a second accessory tool comprising a servo slide assembly including a frame member adapted to be removably and adjustably mounted on said spacer and a slide member slidably supported on said frame member, said slide member being adapted to removably and adjustably receive and retain the electrode assembly thereon, said slide assembly further including a motor coupled to said slide member and adapted to receive an electrical control signal to controllably move said slide member relative to said frame member along a slide axis wherein said swivel spacer permits angular adjustment of the slide assembly relative to said base tool.

2. The system as claimed in claim 1 wherein each of said accessory tools includes male and female dovetails to provide an adjustable dovetail joint for interconnecting said accessory tools.

3. The system as claimed in claim 1 or claim 2 wherein said motor has a threaded drive shaft rotatably supported on said frame member and wherein said slide assembly includes a split nut coupled to said slide member and threadedly mounted on said shaft to move therealong upon rotary movement of said shaft.

4. The system as claimed in claim 3 wherein said slide assembly includes a solenoid having a plunger and a spring member supported by said split nut for flexibly coupling said split nut and said slide member, said solenoid being energized by a second control signal to cause said plunger to vibrate said spring member.

5. The system as claimed in claim 4 wherein said spring member comprises a spring steel sheet and wherein said plunger moves in a direction transverse said slide axis to vibrate said steel sheet.

6. The system as claimed in claim 1 including a dial indicator connected to said slide member and to said frame member for providing a visual indication of the relative position therebetween.

7. The system as claimed in claim 1 including a position transducer connected to said slide and frame members for providing an electrical signal representation of the relative position therebetween.

* * * * *